US009921967B2

(12) United States Patent
Bryant et al.

(10) Patent No.: US 9,921,967 B2
(45) Date of Patent: *Mar. 20, 2018

(54) MULTI-CORE SHARED PAGE MISS HANDLER

(75) Inventors: Christopher D. Bryant, Austin, TX (US); Rama S. Gopal, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 964 days.

This patent is subject to a terminal disclaimer.

(21) Appl. No.: 13/191,294

(22) Filed: Jul. 26, 2011

(65) Prior Publication Data
US 2013/0031332 A1    Jan. 31, 2013

(51) Int. Cl.
G06F 12/10      (2016.01)
G06F 12/1036    (2016.01)
G06F 12/084     (2016.01)

(52) U.S. Cl.
CPC ........ *G06F 12/1036* (2013.01); *G06F 12/084* (2013.01); *G06F 2212/681* (2013.01)

(58) Field of Classification Search
CPC ............ G06F 12/1027; G06F 12/1036; G06F 2212/652; G06F 2212/654; G06F 2212/68; G06F 2212/681–2212/684
USPC ........................................................ 711/207
See application file for complete search history.

(56) References Cited

U.S. PATENT DOCUMENTS 4,890,223 A * 12/1989 Cruess ................ G06F 12/1036
                                                711/164
5,123,101 A *  6/1992 Sindhu ................ G06F 12/1036
                                                711/207
5,349,651 A *  9/1994 Hetherington ...... G06F 12/1045
                                                711/207

(Continued)

FOREIGN PATENT DOCUMENTS

EP        1076293 A1    2/2001
TW      200820081 A     5/2008
(Continued)

OTHER PUBLICATIONS

Teller, P.J, TLB Consistency on highly-parallel share-memory multiprocessors, System Sciences, 1988. vol. I. Architeture Track, Proceedings of the Twenty-First Annual Hawaii International Conference, p. 184-193.*

(Continued)

*Primary Examiner* — Midys Rojas
*Assistant Examiner* — Khoa D Doan
(74) *Attorney, Agent, or Firm* — Nicholson De Vos Webster & Elliott, LLP

(57) ABSTRACT

Methods and apparatus are disclosed for using a shared page miss handler device to satisfy page miss requests of a plurality of devices in a multi-core system. One embodiment of such a method comprises receiving one or more page miss requests from one or more respective requesting devices of the plurality of devices in the multi-core system, and arbitrating to identify a first page miss requests of the one or (Continued)

more requesting devices A page table walk is performed to generate a physical address responsive to the first page miss request. Then the physical address is sent to the corresponding requesting device, or a fault is signaled to an operating system for the corresponding requesting device responsive to the first page miss request.

21 Claims, 6 Drawing Sheets

(56) References Cited

U.S. PATENT DOCUMENTS

| | | | | |
|---|---|---|---|---|
| 5,440,710 A * | 8/1995 | Richter | G06F 11/3648 | 703/23 |
| 5,613,083 A * | 3/1997 | Glew | G06F 12/1027 | 711/207 |
| 5,802,571 A * | 9/1998 | Konigsburg | G06F 12/0859 | 711/133 |
| 5,802,604 A * | 9/1998 | Stewart | G06F 12/1027 | 711/206 |
| 5,809,530 A * | 9/1998 | Samra | G06F 12/0897 | 711/119 |
| 5,809,563 A * | 9/1998 | Yamada | G06F 12/1036 | 711/206 |
| 5,835,963 A * | 11/1998 | Yoshioka | G06F 12/1054 | 365/49.17 |
| 5,852,738 A * | 12/1998 | Bealkowski | G06F 12/1027 | 711/200 |
| 5,854,913 A * | 12/1998 | Goetz | G06F 9/30174 | 711/207 |
| 5,913,923 A * | 6/1999 | Dunlap | G06F 12/1081 | 710/100 |
| 6,356,989 B1 * | 3/2002 | Hays | G06F 12/1027 | 711/205 |
| 6,370,632 B1 * | 4/2002 | Kikuta | G06F 12/0837 | 711/205 |
| 6,393,536 B1 * | 5/2002 | Hughes | G06F 9/3834 | 711/118 |
| 6,430,667 B1 * | 8/2002 | Loen | G06F 12/109 | 711/153 |
| 6,446,189 B1 * | 9/2002 | Zuraski, Jr. | G06F 12/1054 | 710/49 |
| 6,523,104 B2 * | 2/2003 | Kissell | G06F 12/1027 | 711/170 |
| 6,715,057 B1 * | 3/2004 | Kessler | G06F 12/1009 | 711/207 |
| 6,760,829 B2 * | 7/2004 | Lasserre | G06F 1/206 | 711/130 |
| 6,775,747 B2 * | 8/2004 | Venkatraman | G06F 9/3842 | 711/137 |
| 6,925,547 B2 * | 8/2005 | Scott | G06F 12/1072 | 370/389 |
| 7,069,413 B1 * | 6/2006 | Agesen | G06F 12/1036 | 711/207 |
| 7,111,145 B1 * | 9/2006 | Chen | G06F 12/109 | 703/23 |
| 7,380,098 B1 * | 5/2008 | Anvin | G06F 12/1045 | 711/144 |
| 7,398,371 B2 * | 7/2008 | Plondke | G06F 9/4812 | 710/260 |
| 7,434,000 B1 * | 10/2008 | Barreh | G06F 12/0859 | 711/118 |
| 7,873,785 B2 | 1/2011 | Olukotun | | |
| 8,244,979 B2 * | 8/2012 | Burns | G06F 12/1036 | 711/122 |
| 8,533,425 B1 * | 9/2013 | Yuan | G06F 13/1642 | 711/133 |
| 2003/0028746 A1 * | 2/2003 | Durrant | G06F 11/1666 | 711/206 |
| 2005/0080998 A1 * | 4/2005 | Day | G06F 12/0835 | 711/141 |
| 2005/0172099 A1 * | 8/2005 | Lowe | G06F 12/1027 | 711/207 |
| 2006/0224815 A1 * | 10/2006 | Yamada | G06F 12/10 | 711/6 |
| 2007/0050595 A1 * | 3/2007 | So | G06F 12/1027 | 711/207 |
| 2007/0061548 A1 * | 3/2007 | Jordan | G06F 12/1027 | 711/207 |
| 2007/0113044 A1 * | 5/2007 | Day | G06F 12/1027 | 711/207 |
| 2007/0288721 A1 * | 12/2007 | Kruger | G06F 9/30043 | 711/207 |
| 2008/0016315 A1 * | 1/2008 | Cohen | G06F 12/1036 | 711/207 |
| 2008/0120485 A1 | 5/2008 | Rothman et al. | | |
| 2008/0134174 A1 * | 6/2008 | Sheu | G06F 12/1036 | 718/1 |
| 2008/0162852 A1 * | 7/2008 | Kareenahalli | G06F 12/0215 | 711/167 |
| 2008/0162868 A1 * | 7/2008 | Glew | G06F 12/1027 | 711/203 |
| 2008/0183931 A1 * | 7/2008 | Verm | G06F 12/10 | 710/260 |
| 2008/0307190 A1 | 12/2008 | Arndt et al. | | |
| 2009/0019252 A1 | 1/2009 | Burns et al. | | |
| 2009/0024820 A1 * | 1/2009 | Ponnuswamy | G06F 11/0778 | 711/170 |
| 2009/0172291 A1 | 7/2009 | Sprangle et al. | | |
| 2009/0198893 A1 | 8/2009 | Sorgard et al. | | |
| 2009/0249036 A1 * | 10/2009 | Rappoport | G06F 1/3203 | 712/220 |
| 2010/0100702 A1 * | 4/2010 | Doi | G06F 12/1036 | 711/207 |
| 2011/0107057 A1 * | 5/2011 | Petolino, Jr. | G06F 12/1027 | 711/207 |
| 2011/0138149 A1 * | 6/2011 | Karlsson | G06F 12/1027 | 711/207 |
| 2011/0161620 A1 * | 6/2011 | Kaminski | G06F 12/1009 | 711/207 |
| 2011/0271057 A1 * | 11/2011 | Karlsson | G06F 12/0855 | 711/122 |
| 2012/0079232 A1 * | 3/2012 | Hinton | G06F 12/0292 | 711/207 |
| 2012/0102296 A1 * | 4/2012 | Petolino, Jr. | G06F 12/1027 | 711/207 |
| 2012/0117301 A1 * | 5/2012 | Wingard | G06F 12/1027 | 711/6 |
| 2012/0137079 A1 * | 5/2012 | Ueda | G06F 12/1036 | 711/141 |
| 2012/0297161 A1 * | 11/2012 | Champagne | G06F 12/1027 | 711/207 |
| 2014/0156942 A1 * | 6/2014 | Ginzburg | G06F 12/12 | 711/133 |
| 2014/0337587 A1 * | 11/2014 | Hower | G06F 8/436 | 711/154 |
| 2015/0100753 A1 * | 4/2015 | Shen | G06F 12/1027 | 711/207 |

FOREIGN PATENT DOCUMENTS

| | | | | |
|---|---|---|---|---|
| TW | 201120643 A | 6/2011 | | |
| WO | WO 2013101020 A1 * | 7/2013 | | G06F 9/30036 |

OTHER PUBLICATIONS

Teller, P.J, Translation-lookaside Buffer Consistency. IEEE, Computer vol. 23, Issue 6, Jun. 1990, p. 26-36.*
Bhattacharjee, A. Shared last-level TLBs for chip multiprocessors. IEEE, 2011 IEEE 17th International Symposium. Feb. 12-16, 2011, p. 62-63.*
Non-Final Office Action from U.S. Appl. No. 15/396,623, dated May 18, 2017, 48 pages.
Non-Final Office Action from U.S. Appl. No. 15/396,626, dated May 18, 2017, 59 pages.

(56) References Cited

OTHER PUBLICATIONS

Non-Final Office Action from U.S. Appl. No. 15/396,628, dated May 18, 2017, 64 pages.
Notice of Allowance from U.S. Appl. No. 15/396,623, dated Oct. 19, 2017, 13 pages.
Notice of Allowance from U.S. Appl. No. 15/396,626, dated Oct. 19, 2017, 13 pages.
International Preliminary Report on Patentability for Application No. PCT/US2012/048062 dated Feb. 6, 2014, 7 pages.
International Search Report and the Written Opinion for Application No. PCT/US2012/048062 dated Jan. 31, 2013, 10 pages.
Office Action and Search report from foreign counterpart Taiwan Patent Application No. 101124283, dated Jun. 12, 2014, 5 pages.
Office Action and Search report from foreign counterpart Taiwan Patent Application No. 104101567, dated Sep. 14, 2015, 5 pages.
Search report from foreign counterpart Taiwan Patent Application No. 105131331, dated Dec. 16, 2016, 2 pages.

* cited by examiner

MULTI-CORE SHARED PAGE MISS HANDLER

FIELD OF THE DISCLOSURE

This disclosure relates generally to the fields of computing and/or communications. In particular, the disclosure relates to a shared page miss handler for use by multiple processing cores or other devices in a multi-core system.

BACKGROUND OF THE DISCLOSURE

Modern processors often include caches to improve the performance of accessing external memory by providing copies of instructions and/or data in smaller faster memories with shorter access latencies. In addition such caches may provide support for fast virtual to physical address translations using a device such as a translation lookaside buffer (TLB) to cache virtual to physical address translations, for example from the system page tables in a paged virtual memory system. When a TLB matches a virtual address to one of the translations stored in the TLB, we may refer to such and event as a TLB hit and the retrieved physical address can be used to access memory in a cache or in main memory more quickly. When a TLB fails to match a virtual address to one of the translations stored in the TLB, we may refer to such and event as a TLB miss or a page miss, and the translation proceeds by looking up the corresponding page table in a process called a page walk.

A page walk is an expensive process, as it involves reading the contents of multiple memory locations and using them to compute the physical address. Modern processors often include a page-miss handler (PMH) in hardware to perform the page walk more quickly. After the physical address is determined by the page walk, the virtual address to physical address mapping is entered into the TLB to be reused in subsequent accesses.

In a multi-core system with multiple processing cores, each of the multiple processing cores may include such a PMH to facilitate page walks on page misses and to populate their respective TLB. In this disclosure, we may refer to a core or processing core in contrast to a thread or execution thread. The processing core may include support for multiple execution threads, including for example, a per-thread general-purpose register file, a per-thread floating-point register file, per-thread execution queues, per-thread state information storage, and partitionalble cache or caches and TLB storage.

In a multi-core system with multiple processing cores, certain other processing hardware or devices may also access the systems main memory. A graphics processor, for example, may read and write to buffers in memory at locations provided by a central processing core or cores. In some systems it may also be desirable for a graphics processor to access a shared cache along with the central processing core or cores to improve access times. In such systems it may even be desirable to provide a device, such as a graphics processor or video processor, etc., with a TLB to cache virtual to physical address translations, and a PMH to facilitate page walks on page misses and to populate their respective TLB.

As the number of processing cores and other devices accessing caches or using virtual memory increases, there may be good reason to expect problems, such as additional memory congestion, and conflicts, and duplication of page walks when virtual memory space is shared by more of these devices.

To date, potential solutions to such reasonably expected problems have not been adequately explored.

BRIEF DESCRIPTION OF THE DRAWINGS

The present invention is illustrated by way of example and not limitation in the figures of the accompanying drawings.

DETAILED DESCRIPTION

Methods and apparatus are disclosed herein for using a shared page miss handler device to satisfy page miss requests of a plurality of devices in a multi-core system. One embodiment of such a method comprises receiving one or more page miss requests from one or more respective requesting devices of the plurality of devices in the multi-core system, and arbitrating to identify a first page miss requests of the one or more requesting devices. A page table walk is performed to generate a physical address responsive to the first page miss request. Then the physical address is sent to the corresponding requesting device, or a fault is signaled to an operating system for the corresponding requesting device responsive to the first page miss request.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 1:
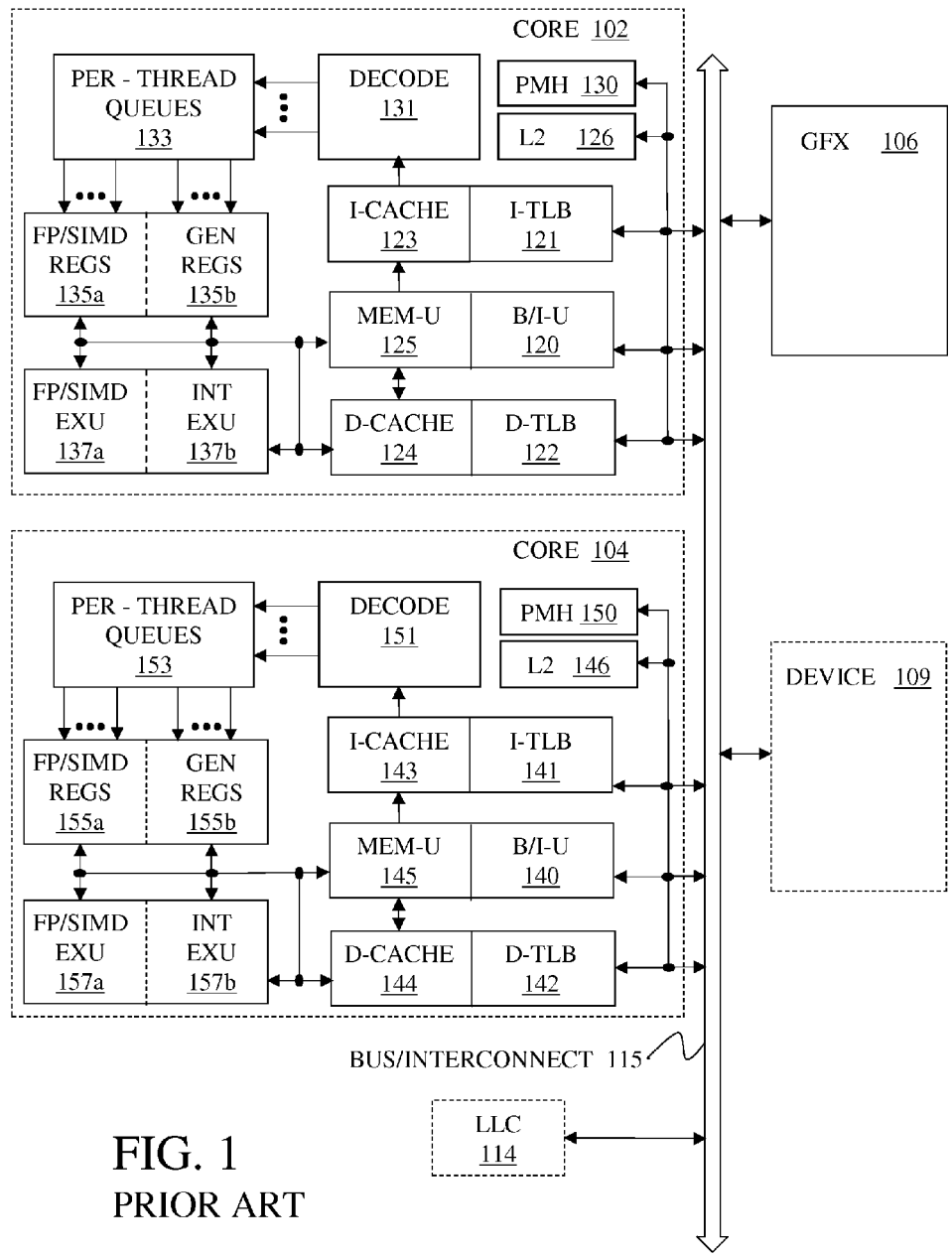
FIG. 1 illustrates a prior art technique for sharing virtual memory in a multi-core system.

FIG. 1 illustrates a prior art technique for sharing virtual memory in a multi-core system. A multi-core processor or multi-core processing system may have various multiple processor cores or other processing devices. For example, the system of FIG. 1 has some number of processor cores, two of which are shown as core 102 and core 104, together with one or more graphics processors, such as GFX 106 or other processors, say for example, device 109. Core 102 and core 104 may be multi-threaded cores processing multiple process threads for execution via decode 131 and decode 151, per-thread queues 133 and 153, floating point/single-instruction multiple-data registers FP/SIMD REGS 135a and FP/SIMD REGS 155a, general registers GEN REGS 135b and GEN REGS 155b, floating point/single-instruction multiple-data execution units FP/SIMD EXU 137a and FP/SIMD EXU 157a, and integer execution units INT EXU 137b and INT EXU 157b, respectively. Core 102 and core 104 may also be coupled with external physical memory (not shown) via a bus/interconnect 115 and memory units MEM-U 125 and MEM-U 145 through bus/interconnect units B/I-U 120 and B/I-U 140, respectively. Core 102 and core 104 may also be coupled with other processing devices GFX 106 and device 109 via external physical memory and bus/interconnect 115 and optionally last level cache, LLC 114.

These multiple processor cores and other processing devices may share virtual memory address spaces via external physical memory and optionally through last level cache, LLC 116. Typically, the homogeneous processor cores may have cache hierachies, e.g. I-cache 123, D-cache 124, L2 126 and I-cache 143, D-cache 144, L2 146, respectively; and TLBs, e.g. I-TLB 121, D-TLB 122 and I-TLB 141, D-TLB 142, respectively to cache virtual to physical address translations from the system page tables in a paged virtual memory system.

The homogeneous processor cores 102 and 104 may also include page-miss handlers, PMH 130 and PMH 150, in hardware to perform page walks through system page tables. When one of the processor cores 102 and 104 tries to access a page in virtual memory that is not mapped to anything in physical memory, or that is not accessable because of the settings of its access rights, the memory access will cause a page fault, and the operating system will be invoked to "fix" the problem.

The other processing devices, such as graphics processor, GFX 106, and device 109 may also have mechanisms such as TLBs for performing virtual to physical address translations, but typically there is some software that runs on the processor cores 102 and 104 and may communicate with drivers for the processing devices GFX 106 and device 109 to set up page tables, etc. for some limited sharing of the paged virtual memory system with the processing devices GFX 106 and device 109. But unlike in the processor cores 102 and 104, these mechanisms may have limited capabilities, lacking the ability to handle page faults, for example. Therefore the pages that are shared with these other processing devices may need to be locked down in physical memory, preventing the operating system from paging them in from, and out to disk as demand dictates. Thus the number of applications that can be supported may be limited, or the amount of physical memory required may be greater than it would otherwise have been. Further the software that runs on the processor cores 102 or 104 to set up page tables, etc. for sharing paged virtual memory with the other processing devices GFX 106 and device 109 incurs a performance overhead, which may reduce the effectiveness of using processing devices GFX 106 and device 109.

In such a multi-core system with multiple processing cores, the other processing devices GFX 106 and device 109 may also access the system's main memory. In some systems it may also be desirable for graphics processor GFX 106 to access a shared cache along with the central processing cores 102 or 104 to improve access times. In such systems it may even be desirable to provide a device, such as processing devices GFX 106 and device 109, with a TLB to cache virtual to physical address translations, and a PMH to facilitate page walks on page misses and to populate their respective TLB.

It will be appreciated that as the number of processing cores and other devices accessing caches or using virtual memory increases, there may be good reason to expect problems, such as additional memory congestion, and conflicts, and duplication of page walks when virtual memory space is shared by more of these devices.

Figure 2:
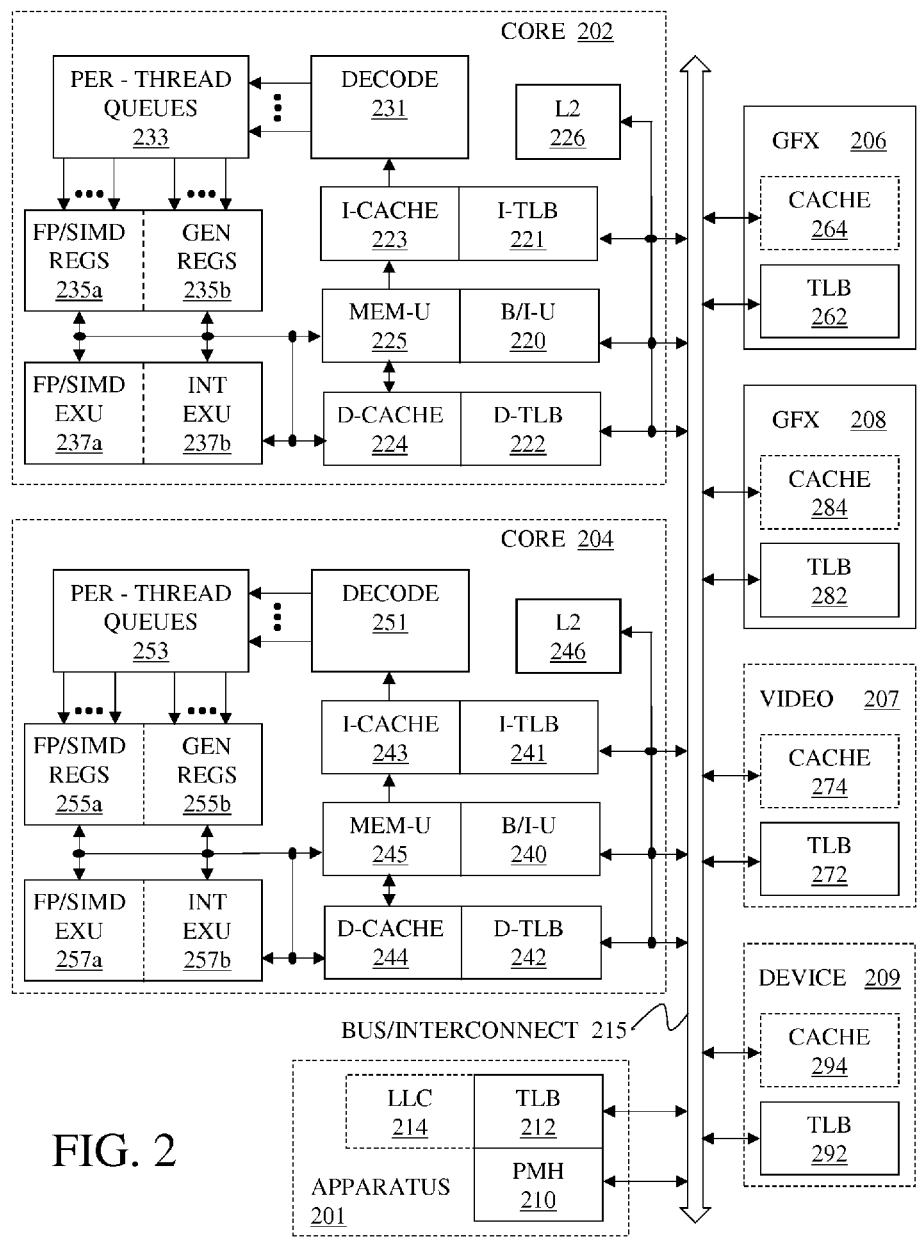
FIG. 2 illustrates one embodiment of an apparatus for using a shared page miss handler for multiple processing cores or other devices to share virtual memory in a multi-core system.

FIG. 2 illustrates one embodiment of an apparatus 201 for using a shared page miss handler for multiple processing cores or other devices to share virtual memory in a multi-core system.

Apparatus 201 comprises TLB 212 to store virtual address translation entries. Page-miss handler, PMH 210, is coupled with the TLB 212 to to facilitate page walks on page misses and to populate virtual address translation entries of TLB 212. For the sake of illustration TLB 212 and PMH 210 are shown as being included in apparatus 201 but it will be appreciated that portions of one or both may be implemented as a separate or a distributed hardware and/or software data structures and reside outside of apparatus 201, for example including main memory.

Apparatus 201 optionally comprises also last level cache, LLC 214, and which are shown as being included in apparatus 201 but may be implemented as separate hardware or software and may reside outside of apparatus 201.

Apparatus 201 is operatively coupled with bus/interconnect 215 for communicating with a multi-core processor or multi-core processing system having multiple processor cores or other processing devices, for sharing virtual memory in the multi-core system. The system may include multiple processor cores, two of which are shown as core 202 and core 204, as well as other processing devices such as graphics devices, two of which are shown as GFX 206 and GFX 208, and optionally other processing devices such as video device 207 and device 209.

The multiple processor cores 202 and 204 may be multi-threaded cores processing multiple process threads for execution via decode 231 and decode 251, per-thread queues 233 and 253, floating point/single-instruction multiple-data registers FP/SIMD REGS 235a and FP/SIMD REGS 255a, general registers GEN REGS 235b and GEN REGS 255b, floating point/single-instruction multiple-data execution units FP/SIMD EXU 237a and FP/SIMD EXU 257a, and integer execution units INT EXU 237b and INT EXU 257b, respectively. Core 202 and core 204 may also be coupled with external memory (not shown) via a bus/interconnect 215 and memory units MEM-U 225 and MEM-U 245 through bus/interconnect units B/I-U 220 and B/I-U 240, respectively. Core 202 and core 204 may also be coupled with graphics processing devices GFX 206 and GFX 208, and optionally other heterogeneous processing devices such as video device 207 and device 209 via external memory and bus/interconnect 215, and optionally via last level cache, LLC 214.

These multiple processing cores or other processing devices may share virtual memory address spaces via external physical memory and optionally through last level cache, LLC 116. Typically, the processor cores 202 and 204 may have cache hierachies, e.g. I-cache 223, D-cache 224, L2 226 and I-cache 243, D-cache 244, L2 246, respectively; and TLBs, e.g. I-TLB 221, D-TLB 222 and I-TLB 241, D-TLB 242, respectively to cache virtual to physical address translations from the system page tables in a paged virtual memory system.

The graphics processors, GFX 206 and GFX 208, and optionally other processing devices such as video device 207 and device 209 may also have mechanisms such as TLBs, e.g. TLB 262, TLB 282, TLB 272 and TLB 292, respectively, for performing virtual to physical address translations. Various embodiments of TLB 262, TLB 282, TLB 272 and TLB 292, respectively, may or may not have the same capabilities, or capabilities comparable to homogeneous processor cores 202 and 204. The graphics processing devices GFX 206, GFX 208, and optionally video device 207 and device 209 may also have caches, e.g. cache 264, cache 284, cache 274 and cache 294, respectively.

If one or more of processor cores 202 and 204, graphics processing devices GFX 206, GFX 208, and optionally video device 207 and device 209, while accessing their TLBs via a TLB lookup, generate a page miss, then they may send a page miss requests to the central PMH 210 of apparatus 201. Apparatus 201 may receive one or more page miss requests, e.g. in a page miss request queue, from one or more respective requesting devices of the plurality of devices, processor cores 202 and 204, graphics processing devices GFX 206, GFX 208, and optionally video device 207 and device 209, in the multi-core system. When processing a page miss request from one of the requesting devices, apparatus 201 may include arbitration logic in order to arbitrate and identify which page miss request of the one or more requesting devices to process. Apparatus 201 may perform a second local TLB lookup to TLB 212 to satisfy the page miss request and upon a page miss in TLB 212, apparatus 201 may then perform a page table walk using PMH 210 to generate a physical address responsive to the first page miss request. Then the physical address is sent by communication logic of apparatus 201 to the corresponding requesting device, or a fault is signaled by apparatus 201 to an operating system for the corresponding requesting device responsive to the first page miss request. It will be appreciated that whenever duplicate page miss request are received by apparatus 201, if any duplicate request has been, or is being processed by PMH 210, the other duplicate requests can wait to be satisfied along with the first request. Thus duplication of page walks may be eliminated by the PMH page walk duplication logic of apparatus 201 when virtual memory space is shared by more of these devices. Similarly, if the first request generates a page fault due to a page not being present in physical memory, duplicate page fault signals to the operating system for the same reason may be eliminated by the PMH page fault duplication logic of apparatus 201, while page faults for access rights violations may be preserved but without a duplication of the page walk.

Embodiments of one or more processes to use a shared page miss handler for multiple processing cores or other devices to share virtual memory in a multi-core system will also be described in greater detail below, in particular with reference to FIGS. 3-4.

Figure 3:
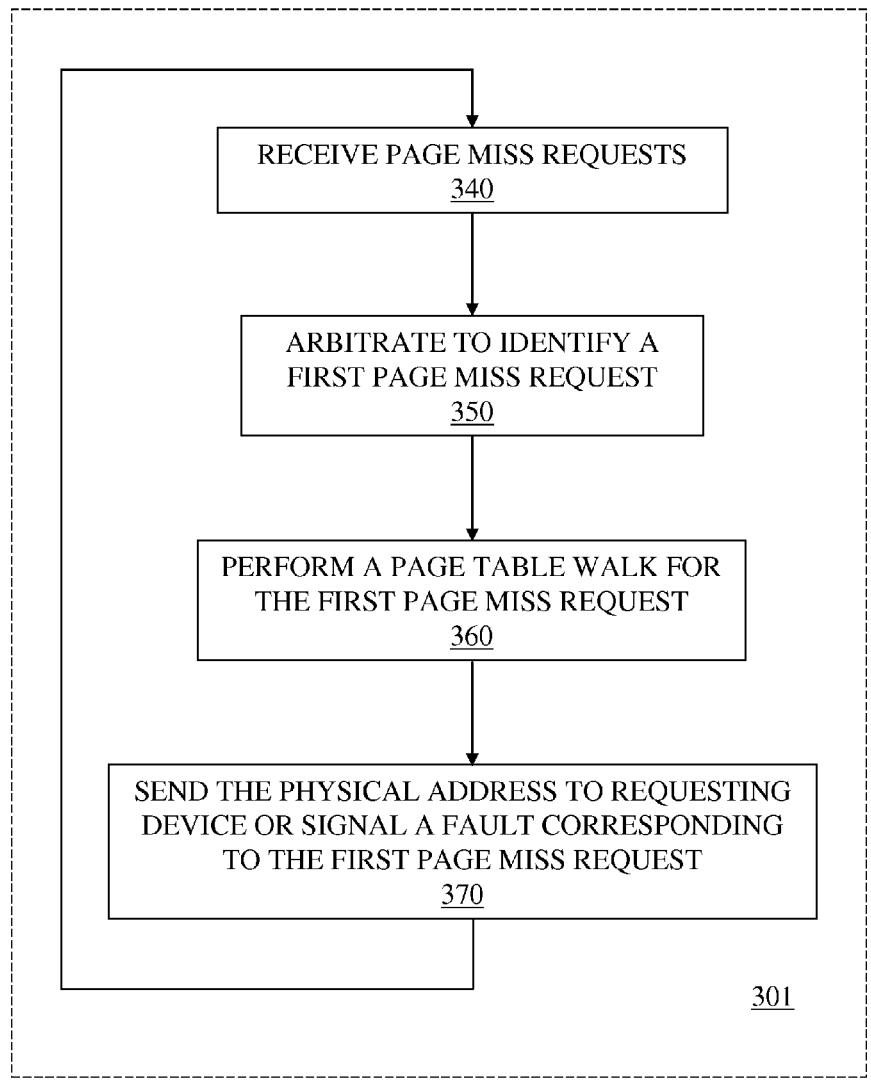
FIG. 3 illustrates a flow diagram for one embodiment of a process to use a shared page miss handler for multiple processing cores or other devices to share virtual memory in a multi-core system.

FIG. 3 illustrates a flow diagram for one embodiment of a process 301 to use a shared page miss handler for multiple processing cores or other devices to share virtual memory in a multi-core system. Process 301 and other processes herein disclosed are performed by processing blocks that may comprise dedicated hardware or software or firmware operation codes executable by general purpose machines or by special purpose machines or by a combination of both.

In processing block 340 of process 301, one or more page miss requests is received from one or more respective requesting devices of a plurality of devices in the multi-core system. In processing block 350, arbitration is performed to identify a first page miss requests of the one or more requesting devices. In processing block 360, a page table walk is performed using the central PMH to generate a physical address responsive to the first page miss request. Then in processing block 370, the physical address is sent to the corresponding requesting device, or a fault is signaled to an operating system for the corresponding requesting device responsive to the first page miss request.

Figure 4:
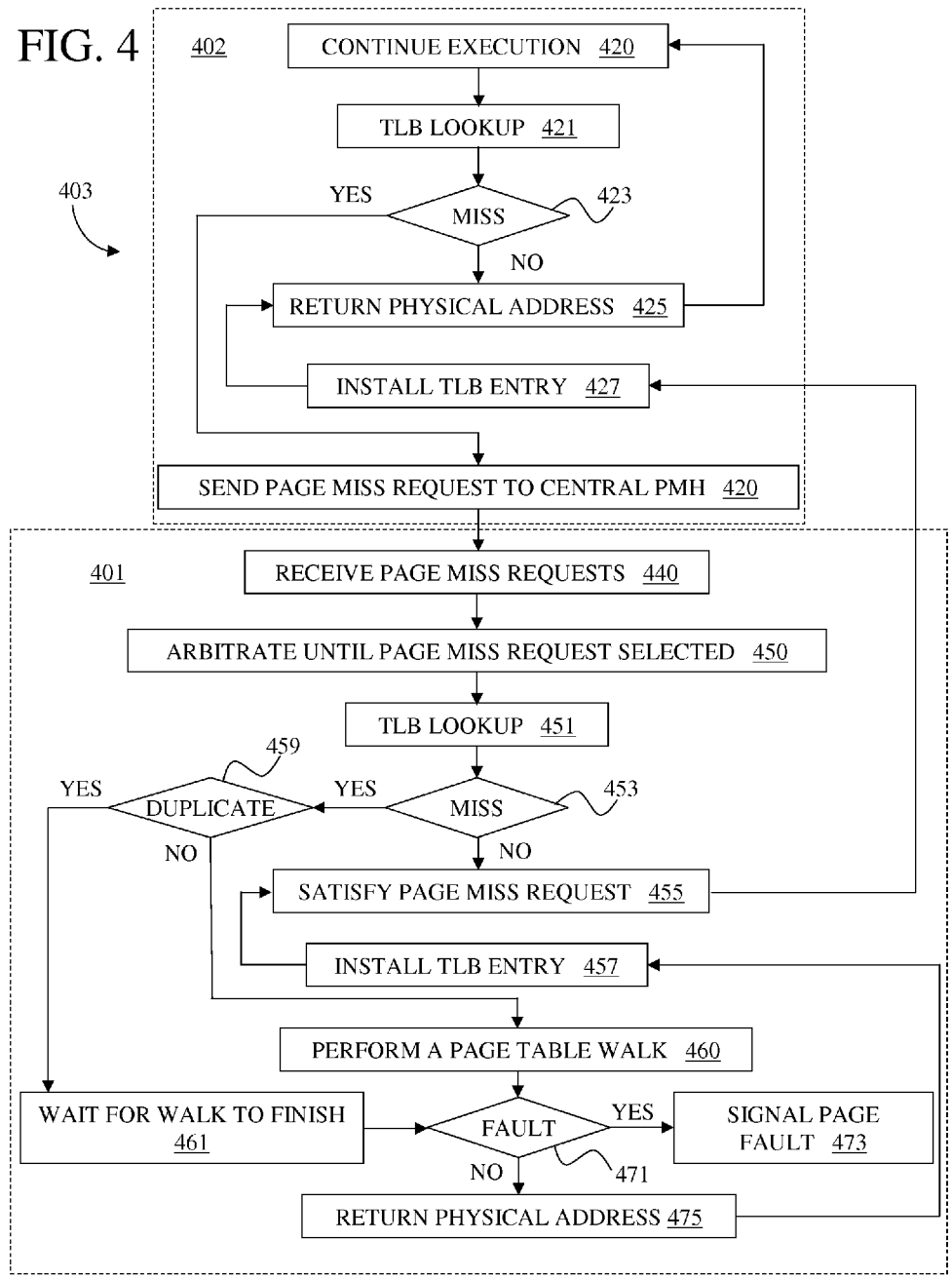
FIG. 4 illustrates a flow diagram for an alternative embodiment of a process to use a shared page miss handler for multiple processing cores or other devices to share virtual memory in a multi-core system.

FIG. 4 illustrates a flow diagram for an alternative embodiment of a process 403 to use a shared page miss handler for multiple processing cores or other devices to share virtual memory in a multi-core system.

In processing block 420 of process 402, one or more processing cores or other devices, e.g. processor cores 202 and 204, graphics processing devices GFX 206, GFX 208, and optionally video device 207 and device 209, are continuing execution. In processing block 421, a TLB lookup is performed by the one or more processing cores or other devices. If in one or more processing cores or other devices, while performing a TLB lookup, a page miss is generated in processing block 423, then in processing block 420 they may send a page miss requests to the central PMH, e.g. PMH 210 of apparatus 201. If not, then a physical address is returned from the TLB in processing block 425, and they may continue execution in processing block 420.

In processing block 440 of process 401, one or more page miss requests is received from one or more respective requesting devices of a plurality of devices in the multi-core system, e.g. processor cores 202 and 204, graphics processing devices GFX 206, GFX 208, and optionally video device 207 and device 209. In processing block 350, arbitration is performed until a first page miss request of the one or more requesting devices is selected. In processing block 451 a second TLB lookup, e.g. to TLB 212, is performed to satisfy the page miss request and upon a second page miss in processing block 453, i.e. in TLB 212, processing proceeds to processing block 459. Otherwise on a TLB hit, processing proceeds to processing block 455 where the page miss request is satisfied and processing resumes in processing block 427 of process 402 where the TLB entry is installed. Then a physical address is returned from the TLB in processing block 425, and execution may continue in processing block 420.

In processing block 459, following from a page miss in processing block 453, if the page miss request is a duplicate request, then in processing block 461 the request waits for the results of a prior page table walk finishing its walk. If the request is not a duplicate request, then a page table walk may be performed in processing block 460, e.g. using PMH 210, to generate a physical address responsive to the first page miss request. If the page table walk results in a fault in processing block 471, then a page fault is signaled to the operating system for the corresponding requesting device responsive to the first page miss request in processing block 473.

Otherwise in processing block 475, the physical address is returned and the TLB entry is installed in processing block 457, i.e. for TLB 212. In processing block 455 the first page miss request is satisfied and the physical address is sent to the corresponding requesting device. Then processing resumes in processing block 427 of process 402 where the TLB entry is installed (i.e. in the TLB of the requesting device). A physical address is then returned from the TLB in processing block 425, and execution may continue in processing block 420.

Figure 5:
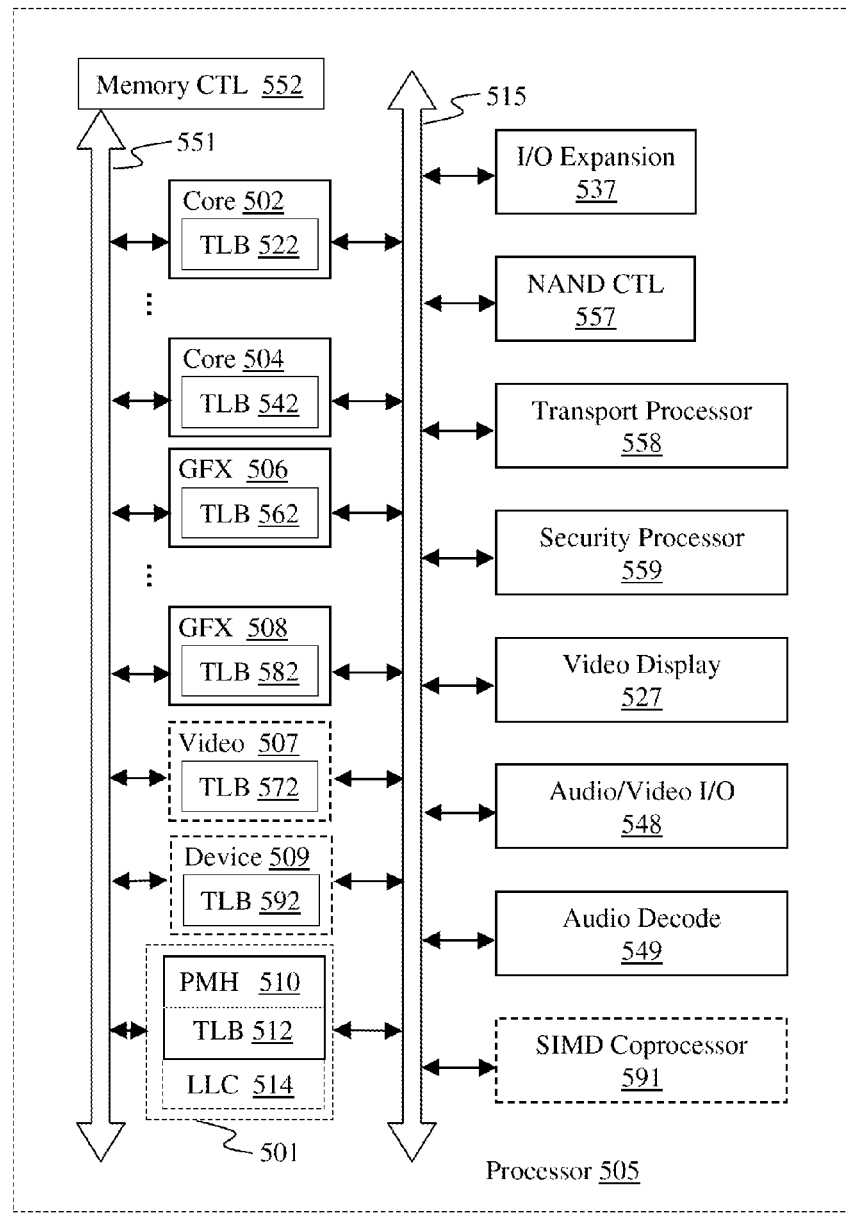
FIG. 5 illustrates one embodiment of a processor that utilizes a shared page miss handler for multiple processing cores or other devices to share virtual memory in a multi-core system.

FIG. 5 illustrates one embodiment of a processor 505 that utilizes a shared page miss handler for multiple processing cores or other devices to share virtual memory in a multi-core system. Apparatus 501 of processor 505 comprises TLB 512 to store virtual address translation entries. Page-miss handler, PMH 510, is coupled with the TLB 512 to facilitate page walks on page misses and to populate virtual address translation entries of TLB 512. For the sake of illustration TLB 512 and PMH 510 are shown as being included in apparatus 501 but it will be appreciated that portions of one or both may be implemented as a separate or a distributed hardware and/or software data structures and reside outside of apparatus 501, for example including main memory.

Apparatus 501 optionally comprises also last level cache, LLC 514, and which are shown as being included in apparatus 501 but may be implemented as separate hardware or software and may reside outside of apparatus 501.

Apparatus 501 is operatively coupled with busses/interconnects 515 and 551 for communicating with multi-core processor 505 or a multi-core processing system having multiple processor cores or other processing devices, for sharing virtual memory, via memory control 552 through external memory (not shown) in the multi-core system. The system may include multiple processor cores, two of which are shown as core 502 and core 504, as well as other processing devices such as graphics devices, two of which are shown as GFX 506 and GFX 508, and optionally other processing devices such as video device 507 and device 509.

The multiple processor cores 502 and 504 may be multi-threaded cores processing multiple process threads for execution as described, for example, with regard to FIG. 2. Core 502 and core 504 may be coupled with varios devices via a bus/interconnect 515, e.g. I/O expansion device 537, NAND control 557, transport processor 558, security processor 559, video display logic 527, audio/video I/O 548, audio decode logic 549, and optionally single-instruction-multiple-data (SIMD) coprocessor 591. Core 502 and core 504 may also be coupled with external memory via a bus/interconnect 551 and memory control 552. Core 502 and core 504 may also be coupled with graphics processing devices GFX 506 and GFX 508, and optionally other processing devices such as video device 507 and device 509 via external memory and bus/interconnects 515 and 551 and optionally via last level cache, LLC 514.

These multiple processing cores or other processing devices may share virtual memory address spaces via an external main memory and optionally through last level cache, LLC 514. Typically, the processor cores may have cache hierachies, and TLBs, e.g. TLB 522 and TLB 542, respectively to cache virtual to physical address translations from the system page tables in a paged virtual memory system.

The graphics processing devices, GFX 506 and GFX 508, and optionally other processing devices such as video device 507 and device 509 may also have mechanisms such as TLBs, e.g. TLB 562, TLB 582, TLB 572 and TLB 592, respectively, for performing virtual to physical address translations. Various embodiments of TLB 562, TLB 582, TLB 572 and TLB 592, respectively, may or may not have the same capabilities, or capabilities comparable to processor cores 502 and 504.

If one or more of processor cores 502 and 504, graphics processing devices GFX 506, GFX 508, and optionally video device 507 and device 509, while accessing their TLBs via a TLB lookup, generate a page miss, then they may send a page miss requests to the central PMH 510 of apparatus 501. Apparatus 501 may receive one or more page miss requests from one or more respective requesting devices of the plurality of devices, processor cores 502 and 504, graphics processing devices GFX 506, GFX 508, and optionally video device 507 and device 509, in the multi-core system by any suitable means, e.g. such as a request queue. When processing a page miss request from one of the requesting devices, apparatus 501 may employ arbitration logic to identify which page miss request of the one or more requesting devices to process. Apparatus 501 may perform a second local TLB lookup to TLB 512 to satisfy the page miss request and upon a page miss in TLB 512, apparatus 501 may then perform a page table walk using PMH 510 to generate a physical address responsive to the first page miss request. Then the physical address may be sent by communication logic of apparatus 501 to the corresponding requesting device, or a fault is signaled by apparatus 501 to an operating system for the corresponding requesting device responsive to the first page miss request. It will be appreciated that whenever duplicate page miss request are received by apparatus 501, if any duplicate request has been, or is being processed by PMH 510, PMH logic of apparatus 501 may cause the other duplicate requests to wait to be satisfied along with the first request. Thus duplication of page walks may be eliminated when virtual memory space is shared by more of these devices. Similarly, if the first request generates a page faul, page fault duplication logic of apparatus 501 may also cause duplicate page fault signals to the operating system to be eliminated.

Figure 6:
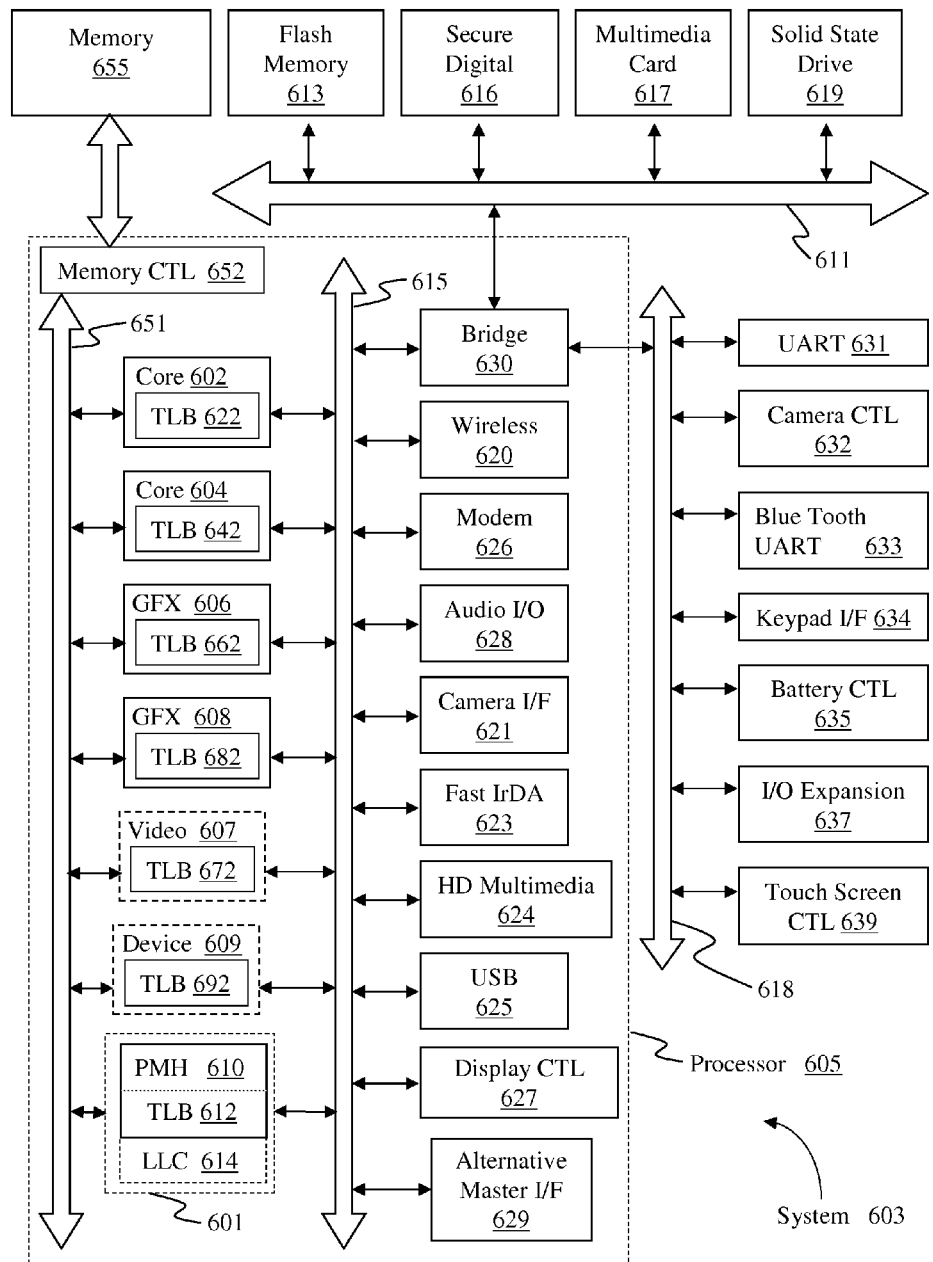
FIG. 6 illustrates one embodiment of a system that utilizes a shared page miss handler for multiple processing cores or other devices to share virtual memory in a multi-core system.

FIG. 6 illustrates one embodiment of a system 603 that utilizes a shared page miss handler for multiple processing cores or other devices to share virtual memory in a multi-core system.

System 603 includes apparatus 601 of processor 605, which comprises TLB 612 to store virtual address translation entries. Page-miss handler, PMH 610, is coupled with the TLB 612 to to facilitate page walks on page misses and to populate virtual address translation entries of TLB 612. For the sake of illustration TLB 612 and PMH 610 are shown as being included in apparatus 601 but it will be appreciated that portions of one or both may be implemented as a separate or a distributed hardware and/or software data structures and reside outside of apparatus 601, for example including main memory 655.

Apparatus 601 optionally comprises also last level cache, LLC 614, and which are shown as being included in apparatus 601 but may be implemented as separate hardware or software and may reside outside of apparatus 601.

Apparatus 601 is operatively coupled with busses/interconnects 615 and 651 for communicating with multi-core processor 605 or a multi-core processing system having multiple processor cores or other processing devices, for sharing virtual memory, via memory control 652 through external memory 655, in the multi-core system.

Embodiments of system 603 may be implemented using standard or non-standard or proprietary technologies, interfaces, busses or interconnects 615 and 651 such as the (Peripheral Component Interconnect) PCI or PCI Express or (Serial Advanced Technology Attachment) SATA for communicating with a multi-core processor or multi-core processing system.

Other embodiments of system 603 may be implemented using standard or non-standard or proprietary technologies, interfaces, busses or interconnects—for example, the SPI (Serial Peripheral Interface) bus; the ISA (Industry Standard Architecture) bus, PC/104, PC/104+ and Extended ISA; USB (Universal Serial Bus) AVC (Audio Video Class); AMBA (Advanced Microcontroller Bus Architecture) (Advanced Peripheral Bus) APB; FireWire (*IEEE Std 1394a-2000 High Performance Serial Bus—Amendment* 1, ISBN 0-7381-1958-X; *IEEE Std 1394b-2002 High Performance Serial Bus—Amendment* 2, ISBN 0-7381-3253-5; *IEEE Std 1394c-2006*, 2007-06-08, ISBN 0-7381-5237-4); HDMI (High-Definition Multimedia Interface); the VESA's (Video Electronic Standards Association) DisplayPort and Mini DisplayPort; the MIPI® (Mobile Industry Processor Interface) Alliance's SLIMbus® (Serial Low-power Inter-chip Media Bus), LLI (Low Latency Interface), CSI (Camera Serial Interface) DSI (Display Serial Interface), etc.

System 603 may include multiple processor cores, two of which are shown as core 602 and core 604, as well as other processing devices such as graphics devices, two of which are shown as GFX 606 and GFX 608, and optionally other processing devices such as video device 607 and device 609.

The multiple processor cores 602 and 604 may be multi-threaded cores processing multiple process threads for execution. Processor core 602 and core 604 may be coupled with various devices via a bus/interconnect 615, e.g. bridge 630, wireless connectivity device 620, modem device 626, and audio I/O devices 628. Some embodiments of system 603 may be implemented as a system on a chip, for example, to use in a tablet computer or a smart phone. In such embodiments wireless connectivity device 620 may provide a wireless LAN (local area network) link, modem device 626 may provide a 4G (fourth generation), 5G (fifth generation), or later telephone link, and audio I/O devices 628 may provide a set of audio human interface devices, for example, a headset, speakers, handset microphone, audio input and output channels, and amplifiers.

Processor cores 602 and 604 are coupled with bus/interconnect 615 for communicating with various other system devices, which may include but are not limited to wireless connectivity device 620, modem device 626, and audio I/O devices 628, camera interface 621, Fast IrDA (Infrared Data Association) port 623, HD (high definition) multimedia interface 624, USB 625, display control 627, and alternate master interface 629. Processor cores 602 and 604 are also coupled with bus/interconnect 615, bridge 630 and bus/interconnect 611 for communicating with various other system devices, which may include but are not limited to flash memory 613, SD (secure digital) memory 616, MMC (multimedia card) 617 and SSD (solid state drive) 619. Processor cores 602 and 604 are coupled with bus/interconnect 615, bridge 630 and bus/interconnect 618 for communicating with various other system devices, which may include but are not limited to UART (universal asynchronous receiver/transmitter) 631, camera control 632, Blue Tooth UART 633 optionally including a Wi-Fi 802.11 a/b/g transceiver and/or a GPS (Global Positioning System) transceiver, keypad 634, battery control 635, I/O expansion 637 and touch screen control 639.

Processor core 602 and core 604 may also be coupled with memory 655 via a bus/interconnect 651 and memory control 652. Processor core 602 and core 604 may also be coupled with graphics processing devices GFX 606 and GFX 608, and optionally other processing devices such as video device 607 and device 609 via memory 655 and bus/interconnects 615 and 651 and optionally via last level cache, LLC 616. Memory 655 and other tangible storage media of system 603 may record functional descriptive material including executable instructions to implement of a process to use a shared page miss handler for multiple processing cores or other devices to share virtual memory in a multi-core system.

Some embodiments of system 603 may adhere to industry standards which allow multiple operating systems running simultaneously within a single computer to natively share devices like Single Root I/O Virtualization (SRIOV), which provides native I/O virtualization in PCI Express topologies, or Multi-Root I/O Virtualization (MRIOV), which provides native I/O virtualization in topologies where multiple root complexes share a PCI Express hierarchy. Some embodiments of system 603 may include standard or non-standard or proprietary technologies, interfaces, busses or interconnects such as the SPI bus, USB, AMBA APB; FireWire, HDMI, Mini DisplayPort, MIPI SLIMbus, MIPI LLI, MIPI CSI, MIPI DSI, etc.

These multiple processing cores or other processing devices may share virtual memory address spaces via memory 655 and optionally through last level cache, LLC 614. Typically, the processor cores may have cache hierachies, and TLBs, e.g. TLB 622 and TLB 642, respectively to cache virtual to physical address translations from a host or guest operating system page tables in a paged virtual memory system.

The graphics processing devices, GFX 606 and GFX 608, and optionally other processing devices such as video device 607 and device 609 may also have mechanisms such as TLBs, e.g. TLB 662, TLB 682, TLB 672 and TLB 692, respectively, for performing virtual to physical address translations. Various embodiments of TLB 662, TLB 682, TLB 672 and TLB 692, respectively, may or may not have the same capabilities, or capabilities comparable to processor cores 602 and 604.

If one or more of processor cores 602 and 604, graphics processing devices GFX 606, GFX 608, and optionally video device 607 and device 609, while accessing their TLBs via a TLB lookup, generate a page miss, then they may send a page miss requests to the central PMH 610 of apparatus 601. Apparatus 601 may receive one or more page miss requests from one or more respective requesting devices of the plurality of devices, processor cores 602 and 604, graphics processing devices GFX 606, GFX 608, and optionally video device 607 and device 609, in the multi-core system. When processing a page miss request from one of the requesting devices, apparatus 601 may first arbitrate to identify which page miss request of the one or more requesting devices to process. Apparatus 601 may perform a second local TLB lookup to TLB 612 to satisfy the page miss request and upon a page miss in TLB 612, apparatus 601 may then perform a page table walk using PMH 610 to generate a physical address responsive to the first page miss request. Then the physical address may be sent by apparatus 601 to the corresponding requesting device, or a fault may be signaled by apparatus 601 to an operating system for the corresponding requesting device responsive to the first page miss request. It will be appreciated that whenever duplicate page miss requests are received by apparatus 601, if any duplicate request has been, or is being processed by PMH 610, the other duplicate requests can wait to be satisfied along with the first request. Thus duplication of page walks may be eliminated when virtual memory space is shared by more of these devices. Similarly, if the first request generates a page faul, duplicate page fault signals to the operating system may also be eliminated.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method for using a shared page miss handler device to satisfy page miss requests of a plurality of devices in a multi-core system, the method comprising:

receiving, at the shared page miss handler device, two or more page miss requests from two or more respective requesting devices of the plurality of devices in the multi-core system;
arbitrating to identify a first page miss request of the two or more requesting devices;
performing a page table walk to generate a physical address responsive to the first page miss request;
eliminating, by the shared page miss handler, a duplicate page table walk for a second page miss request received from the two or more requesting devices;
eliminating, by the shared page miss handler, a duplicate page fault for a third page miss request received from the two or more requesting devices; and
signaling a fault to an operating system for the corresponding requesting device responsive to the first page miss request.

2. The method of claim 1 wherein said two or more page miss requests are received from two or more respective requesting devices of the plurality of devices in the multi-core system, which while accessing their local TLBs, generate a page miss.

3. The method of claim 1 further comprising:
performing, responsive to the first page miss request, a TLB lookup in an attempt to satisfy the first page miss request.

4. The method of claim 3 wherein performing the page table walk to generate a physical address is in response to a page miss while performing the TLB lookup in an attempt to satisfy the first page miss request.

5. The method of claim 1 further comprising:
installing a first TLB entry using the physical address;
sending the physical address to the corresponding requesting device to satisfy the first page miss request; and
installing a second TLB entry using the physical address in the corresponding requesting device.

6. A non-transitory tangible machine-readable medium to record functional descriptive material including executable instructions, which if executed by a machine cause the machine to:
receive, at a shared page miss handler device, at least two page miss requests from at least two respective requesting devices of a plurality of devices in a multi-core system;
enqueue the at least two page miss requests in a single page miss request queue;
arbitrate among entries of the page miss request queue to identify a first page miss request of the at least two requesting devices;
perform a page table walk to generate a physical address responsive to the first page miss request;
eliminate, by the shared page miss handler, a duplicate page table walk for a second page miss request received from the at least two requesting devices;
eliminate, by the shared page miss handler, a duplicate page fault for a third page miss request received from the at least two requesting devices; and
signal a fault to an operating system responsive to the first page miss request for the corresponding requesting device.

7. The non-transitory tangible machine-readable medium of claim 6 further including executable instructions, which if executed by a machine causes the machine to:
perform, responsive to the first page miss request, a TLB lookup in an attempt to satisfy the first page miss request.

8. The non-transitory tangible machine-readable medium of claim 7 wherein performing the page table walk to generate a physical address is in response to a page miss while performing the TLB lookup in an attempt to satisfy the first page miss request.

9. The non-transitory tangible machine-readable medium of claim 6 further including executable instructions, which if executed by a machine cause the machine to:
install a first TLB entry using the physical address; and
send the first TLB entry to the corresponding requesting device to satisfy the first page miss request.

10. An apparatus comprising:
a single page miss request queue to receive multiple page miss requests from multiple respective requesting devices of a plurality of devices in a multi-core system;
arbitration logic to identify a first page miss request of a corresponding requesting device of the multiple requesting devices;
a page miss handler (PMH) in hardware, shared by the multiple requesting devices of the plurality of devices, to perform a page table walk to generate a physical address responsive to the first page miss request, the PMH further to eliminate a duplicate page table walk for a second page miss request received from the multiple requesting devices, and eliminate a duplicate page fault for a third page miss request received from the multiple requesting devices; and
communication logic to signal a fault to an operating system for the corresponding requesting device responsive to the first page miss request.

11. The apparatus of claim 10 wherein said multiple page miss requests are received from multiple respective requesting devices of the plurality of devices in the multi-core system, which, while accessing their local TLBs, generate a page miss.

12. The apparatus of claim 10 further comprising:
a TLB to perform, responsive to the first page miss request, a TLB lookup in an attempt to satisfy the first page miss request.

13. The apparatus of claim 12 wherein the PMH performs the page table walk to generate a physical address in response to a page miss while the TLB is performing the TLB lookup in an attempt to satisfy the first page miss request.

14. The apparatus of claim 12 wherein:
said TLB further to install a first TLB entry using the physical address; and
said communication logic to send the first TLB entry comprising the physical address to the corresponding requesting device to satisfy the first page miss request.

15. The apparatus of claim 10 wherein the page miss request queue to enqueue page miss requests received from at least four heterogeneous processing devices.

16. A multi-core processor comprising:
a plurality of devices to concurrently access a paged virtual memory space, said plurality of devices including a plurality of processing cores respectively having cache memories;
a shared page miss handler (PMH) device to satisfy page miss requests of the plurality of devices, said PMH to:
enqueue, at a single page miss request queue, at least two page miss requests received from at least two respective requesting devices of a plurality of devices in a multi-core system;

arbitrate among entries of the page miss request queue to identify a first page miss request of a corresponding requesting device of the at least two requesting devices;

perform a page table walk to generate a physical address responsive to the first page miss request;

eliminate a duplicate page table walk for a second page miss request received from the plurality of devices, and eliminate a duplicate page fault for a third page miss request received from the plurality of devices; and signal a fault to an operating system for the corresponding requesting device responsive to the first page miss request.

17. The multi-core processor of claim 16 further comprising:

a shared TLB to perform, responsive to the first page miss request, a TLB lookup in an attempt to satisfy the first page miss request.

18. The multi-core processor of claim 17 wherein the PMH device performs the page table walk to generate a physical address in response to a page miss while the shared TLB is performing the TLB lookup in an attempt to satisfy the first page miss request.

19. A system comprising:

a plurality of devices to concurrently access a paged virtual memory space, said plurality of devices including a plurality of processing cores respectively having cache memories;

a physical system memory coupled with plurality of devices to provide access to the paged virtual memory space;

a shared page miss handler (PMH) device to satisfy page miss requests of the plurality of devices said PMH to:

receive at least two page miss requests from at least two respective requesting devices of the plurality of devices in the system;

enqueue the at least two page miss requests in a single page miss request queue;

arbitrate among entries of the page miss request queue to identify a first page miss request of a corresponding requesting device of the at least two requesting devices;

perform a page table walk to generate a physical address responsive to the first page miss request;

eliminate a duplicate page table walk for a second page miss request received from the at least two requesting devices, and eliminate a duplicate page fault for a third page miss request received from the at least two requesting devices; and when the page table walk does not result in a fault, send the physical address to the corresponding requesting device, otherwise, when the page table walk does result in a fault, signal a fault to an operating system for the corresponding requesting device responsive to the first page miss request.

20. The system of claim 19 further comprising:

a shared TLB to perform, responsive to the first page miss request, a TLB lookup in an attempt to satisfy the first page miss request.

21. The system of claim 20 wherein the PMH device performs the page table walk to generate a physical address in response to a page miss while the shared TLB is performing the TLB lookup in an attempt to satisfy the first page miss request.

* * * * *